United States Patent [19]
Arenz

[11] Patent Number: 4,646,685
[45] Date of Patent: Mar. 3, 1987

[54] DISPOSABLE LITTER BOX AND SHEET ASSEMBLY

[76] Inventor: Mary M. Arenz, 13320 SW. Allen Blvd., #6, Beaverton, Oreg. 97005

[21] Appl. No.: 791,544

[22] Filed: Oct. 25, 1985

[51] Int. Cl.[4] .................. A01K 23/00; B65D 90/08
[52] U.S. Cl. ........................................ 119/1; 220/449
[58] Field of Search ............................. 119/1; 220/449

[56] References Cited

U.S. PATENT DOCUMENTS

| | | | |
|---|---|---|---|
| 3,257,068 | 6/1966 | Wright | 220/449 X |
| 3,392,900 | 7/1968 | Vogt | 220/449 |
| 3,626,900 | 12/1971 | Failla | 119/1 |
| 3,684,155 | 8/1972 | Smith | 119/1 X |
| 3,978,818 | 9/1976 | Heldenbrand | 119/1 |
| 4,014,292 | 3/1977 | Coughlin et al. | 119/1 |
| 4,156,400 | 5/1979 | Migdal | 119/1 |
| 4,305,544 | 12/1981 | Noonan | 119/1 X |
| 4,312,295 | 1/1982 | Harrington | 119/1 |
| 4,501,226 | 2/1985 | Bienvenue et al. | 119/1 |

Primary Examiner—Robert P. Swiatek
Attorney, Agent, or Firm—Kolisch, Hartwell & Dickinson

[57] ABSTRACT

A litter box and sheet assembly, a panel of box-forming material, and a sheet secured to a central portion of the panel. The panel has side and end flaps free of the sheet which may be folded upwardly from a central portion of the panel to form a litter box for cats.

7 Claims, 5 Drawing Figures

DISPOSABLE LITTER BOX AND SHEET ASSEMBLY

BACKGROUND AND SUMMARY OF THE INVENTION

This invention relates to a litter box assembly which includes structure formable into a litter box and a sheet of flexible material. This sheet may function as a protective envelope for the assembly during distribution to the purchaser, and during use of the assembly may be unfolded to lie flat against the floor or other support and provide a protective underlayment. The sheet further may be employed to enclose the box and its contents after use and during disposal.

While it is difficult to train pets such as dogs to perform elimination functions in a given location such as a box, such is not true of kittens and cats. This pet specie can be quite readily trained to dispose of body wastes in a designated region. As a consequence, cat litter boxes are known which conventionally are provided with a bed of litter material, and these boxes containing litter are left in a known place in the dwelling where the cat returns on feeling the need for relief.

While cats are known to be relatively neat in their actions, it is not uncommon for some litter to be displaced from the box during use, which messes the area around the box. Furthermore, a box and its contents at some time must be discarded, which often times requires that the box and its contents be wrapped in some manner if proper disposal is to be effectuated. This raises a convenience problem.

An object of this invention is the provision of a novel box structure and underlayment assembly, which in a practical and very satisfactory manner takes care of the various problems usually associated with the use and disposal of a litter box.

A further object is to provide such an assembly which can be produced and sold at relatively low cost.

In a preferred embodiment of the invention, the assembly comprises a panel of stiff, box-forming material, which includes a central rectangular portion and flaps joined to this rectangular portion through score lines. The rectangular portion is suitably secured to an expanse of sheet material, which typically might be a sheet of plastic, such sheet material being unjoined to the flaps mentioned. The assembly may be marketed with the sheet material folded over the panel discussed, thus to protect it and provide a non-bulky thin piece of merchandise. To prepare for use, the sheet is opened up and provides an underlayment for a litter box which is constructed from the panel. More specifically, the flaps in the panel are folded upwardly and ends suitably interanchored to provide the upstanding walls of the litter box. With a bed of cat litter provided in the box, the box acts to confine the litter, with the box and its contents acting as an attractant for the cat. When disposing of the box and its contents, margins of the sheet expanse are brought together over the box and secured as by a drawstring.

Various other features and advantages are attained by the invention, and such is described hereinbelow in conjunction with the accompanying drawings, wherein.

Figure 1:
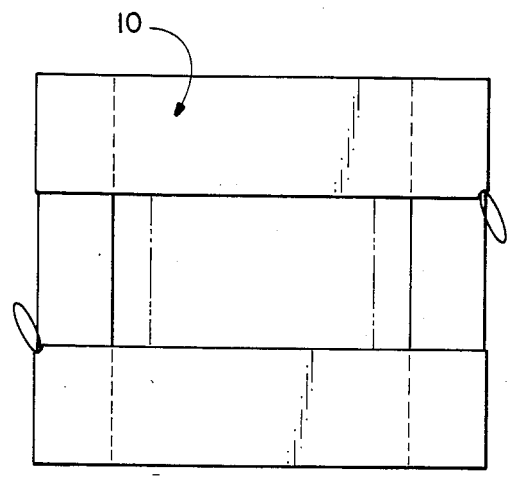
FIG. 1 illustrates the assembly as such would be prepared for distribution and sale, with a sheet in the assembly folded over to provide a protective envelope for a panel within the assembly.

Referring now to the drawings, the assembly contemplated comprises a sheet of flexible material indicated generally at 10, and positioned on one side of this sheet and inwardly from its margins, what is referred to herein as a panel 12. In the particular embodiment illustrated, the panel and the sheet are both of rectangular configuration, and the panel is located substantially centrally of the sheet.

Considering specifics of panel 12, such may be made of stiff box-forming material such as cardboard or a heavy plastic. If made of plastic, the plastic should have sufficient stiffness whereby flaps to be described in the panel will stand up by themselves when the panel is formed into a box. A plastic composition has the advantage of being by its nature waterproof, which is a desirable feature when considering a litter box. If cardboard is used, however, essentially the same characteristic can be obtained by coating a side of the panel, which is the upper side and the side facing the viewer in FIG. 2, with a water-impervious coating.

Figure 2:
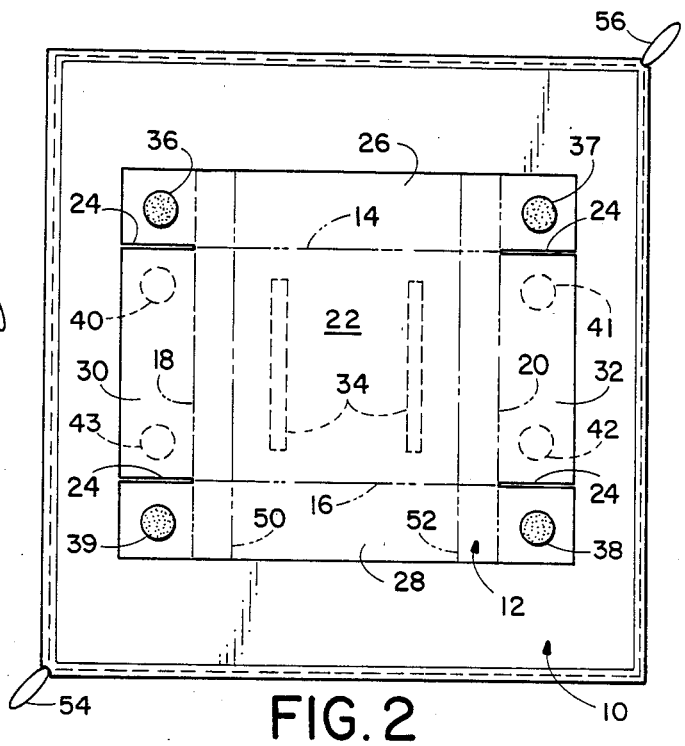
FIG. 2 illustrates the assembly with the sheet unfolded and laying flat as on a floor, and with the panel which forms a part of the assembly now exposed.

In the embodiment of the invention shown in FIG. 2, panel 12 is provided with score lines 14 and 16 extending the length of the panel and score lines 18 and 20 extending along the ends of the panel. That portion of the panel which is bounded by these score lines forms the bottom portion or base of a box produced from the panel, and has been given the reference numeral 22. Shown at 24 are cuts which are continuations of score lines 14, 16.

The cuts and score lines define four flaps, i.e. longitudinally extending flaps 26, 28 and end flaps 30 and 32, which form the extremities of the panel and which join with the base through the score lines. Flaps 26, 28 are longer than the score lines joining the flaps to floor 22. Flaps 30, 32 have essentially the length of score lines 18, 20.

Sheet material 10 is secured to panel 12 in a region inwardly of score lines 14, 16 and 18, 20. This securement may be done as by means of adhesive deposits shown at 34 interposed between the underside of the panel and the underlying sheet as shown in FIG. 2. The flaps are not joined to the sheet material which permits the flaps to be bent to extend upwardly from floor 22, free of the sheet material.

Figure 3:
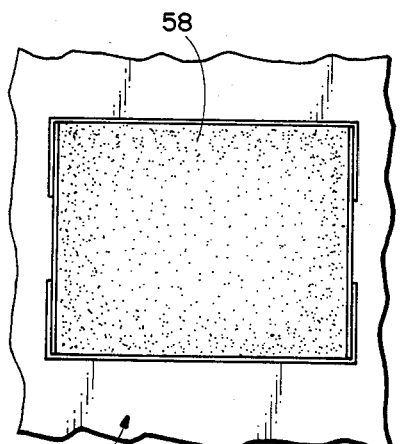
FIG. 3 illustrates portions of the assembly of FIG. 2, but with flaps in the panel bent upwardly and intersecured whereby the panel is converted to a box and the box containing cat litter.

To form a litter box from the panel, the flaps are bent to extend upwardly from floor 22, substantially at right angles thereto and the ends of flaps 26, 28 are bent inwardly. Adjacent ends of the flaps are then intersecured to maintain the flaps in this position and to form a box with the flaps now forming the sides of the box. This intersecurement is performed in the embodiment shown in FIG. 2 by an interengaging tab system, with the tabs shown at 36 through 39 in solid outline in FIG. 2 being secured to the upper side of the panel and the tabs shown at 40 through 43 being secured adjacent the ends of the end flaps 30, 32 but on the underside of the panel. Cooperating tabs, as exemplified by tabs 36, 40 at adjacent ends of adjacent flaps, when pressed against each other and through a hook and loop fastener system, detachably join together. A fastener system of this type is one currently marketed under the trademark Velcro. It should be apparent from this description that with the flaps turned upwardly and the ends of flaps 26, 28 bent inwardly to form a corner, and with complementing tabs then pressed against each other, a box with upstanding sides is produced. This is illustrated in FIG. 3.

Figure 4:
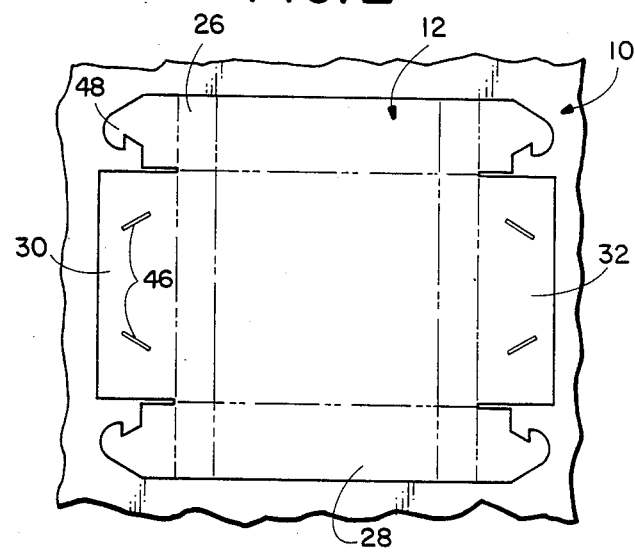
FIG. 4 illustrates a modified form of the invention with a different means for securing end portions of flaps in the panel with the flaps bent to form the sides of a box.

In a modified form of the invention shown in FIG. 4, panel 12 is prepared with end flaps 30, 32 provided with cut slots such as those shown at 46. The ends of the side flaps 26, 28 are cut to have a notched tongue as is shown at 48. With this form of the panel, with the side and end flaps bent upwardly and with the extremities of the side flaps turned inwardly, the notched tongues slide into the cut slots to produce a detachable connection with the flaps upstanding and forming the sides of a box.

By way of an example, a box may be produced which has a base measuring 16 inches along its length and 12 inches along its width. By providing flaps of four-inch width, a box is formed having upstanding sides producing a depth in the box of four inches.

It may also be desirable to include in the panel score lines such as those shown at 50, 52 extending transversely of the panel. Such score lines accommodate inward folding of the ends of the box during disposal of the box and its contents.

Sheet 10 may be made of a plastic material. The sheet is flexible and to these ends the sheet may resemble the sheet material used in the manufacture of plastic disposal bags currently marketed. At the edges of the sheet, the edges are folded over and suitably secured to the remainder of the sheet whereby an internal channel is provided extending about the margins of the sheet for the reception of a drawstring, extremities of which are shown at 54 and 56.

In distributing the assembly for sale, panel 12 is flat with floor portion 22 and the various flaps extending in a common plane. Sheet 10 may be folded over the panel and on itself as shown in FIG. 1 to provide a compact, relatively thin item of merchandise with the sheet material functioning to protect the panel which it envelopes.

During use, the sheet material is unfolded and laid out flat on the floor. The flaps forming the margins of the panel are bent to extend upwardly and adjacent end extremities of the flaps intersecured to produce the box. With this condition, marginal portions of the sheet form a protective barrier collecting any litter that may be inadvertently scattered through use of the box by a cat or a kitten. Litter is placed within the box thus to be confined in the box, as demonstrated by the bed of litter shown at 58 in FIG. 3.

Figure 5:
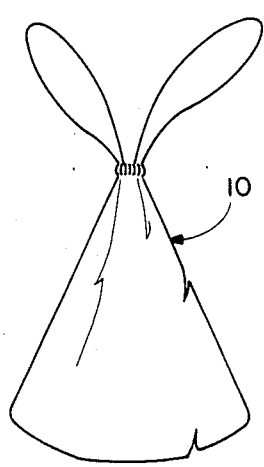
FIG. 5 illustrates how the box and its contents may be enveloped by the sheet to form a neat package for disposal purposes.

To dispose of the box and its contents, the sheet material is drawn upwardly over the top of the box, and if desired to reduce the overall size of the box, ends of the box are bent inwardly using score lines 50, 52. By tightening the drawstring, margins of the sheet are drawn together and secured to produce a disposable package exemplified by the package illustrated in FIG. 5.

While embodiments of the invention have been described, it should be obvious that variations and modification are possible without departing from the invention. It is desired to cover all such modifications and variations coming within the scope of this invention.

It is claimed and desired to secure by Letters Patent:

1. A litter box and protective underlayment and disposal sheet assembly comprising,
   an open-top box having a stiff rectangular base panel having rectilinear margins and upstanding sides joined to the margins of the base panel and projecting upwardly therefrom operable to confine a bed of litter material deposited within the box attractive to animal usage,
   a flexible sheet joined to the underside of the base panel of said box and unjoined to the sides so that the sheet may lie flat when placed on a support such as a floor with the box sides extending upwardly from the sheet,
   said sheet being joined to the base panel at a region of the sheet spaced inwardly from the sheet's edges and the sheet having sufficient expanse extending from said region to enable marginal portions of the sheet with the sheet laying flat to provide a protective barrier for the box in zones encompassing the base of the box and to enable said marginal portions to come together with the sheet brought into closing relation over the top of the box, and
   means connecting with the sheet adjacent at least an edge thereof for holding the sheet edges together with such brought into closing relation over the top of the box.

2. The assembly of claim 1, wherein the box sides comprise flaps joined to the base panel through score lines, and said flaps have end attachment means detachably joining adjacent ends of the flaps.

3. The assembly of claim 1, wherein each respective side comprises a flap joined to the base panel through a score line, each corner of the box being formed by a pair of flaps having adjacent ends that overlap, opposed portions of said overlapping adjacent ends having a detachable hook and loop fastener means detachably securing them together.

4. The litter box of claim 3, which further includes at least a score line extending across the base panel of the box between ends of the box promoting folding of the box with ends moving toward each other.

5. An article of manufacture comprising:
   a substantially rectangular panel of stiff material including a rectangular central portion bounded by four substantially straight margins and an elongate flap joined to each of said margins through a score line, such central portion lying in a plane and said flaps lying in or substantially in said plane,
   a flexible sheet joined to one side of said rectangular central portion and unjoined to said flaps, said sheet having marginal portions folded over the other side of said panel to form an enveloping package,
   said sheet being unfoldable to extend in a flat state against a support such as a floor with said panel then being located on the top of the sheet, said flaps being foldable about said score lines to extend normal to said central portion at said central portion's margins, and
   attaching means for intersecuring the flaps when so folded to maintain said flaps normal to said central portion.

6. The article of claim 5, wherein one set of flaps have a length exceeding the length of the margins of the central portion to which they are joined, and another set of flaps having a length substantially equaling the length of the margins of the central portion to which they are joined, ends of said one set of flaps overlapping ends of said other set of flaps with the flaps upright, and wherein said attaching means intersecure said overlapped ends of the flaps.

7. The article of claim 6, wherein said attaching means comprises a hook and loop fastening means.

* * * * *